No. 768,180. PATENTED AUG. 23, 1904.
A. J. JACOBSON.
GALVANIC BATTERY.
APPLICATION FILED MAR. 19, 1903.
NO MODEL.
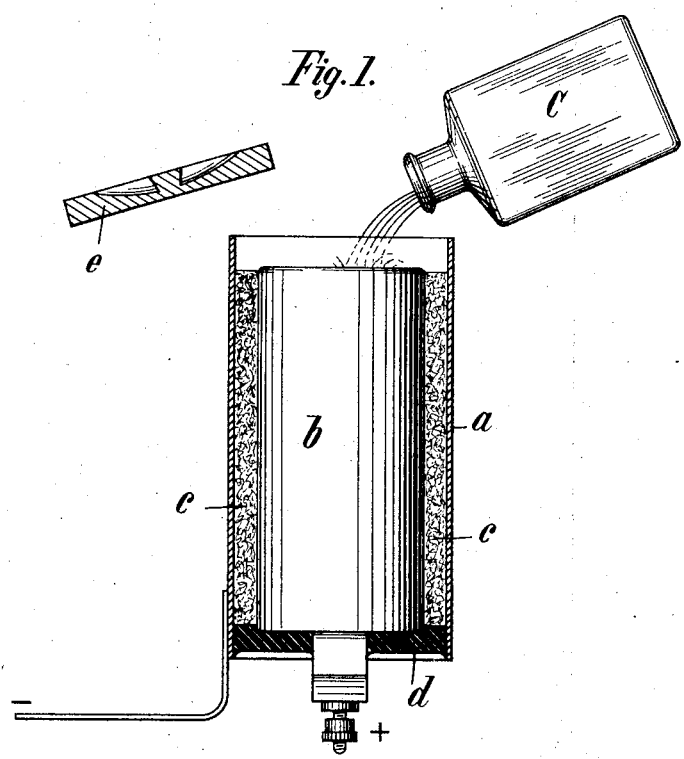
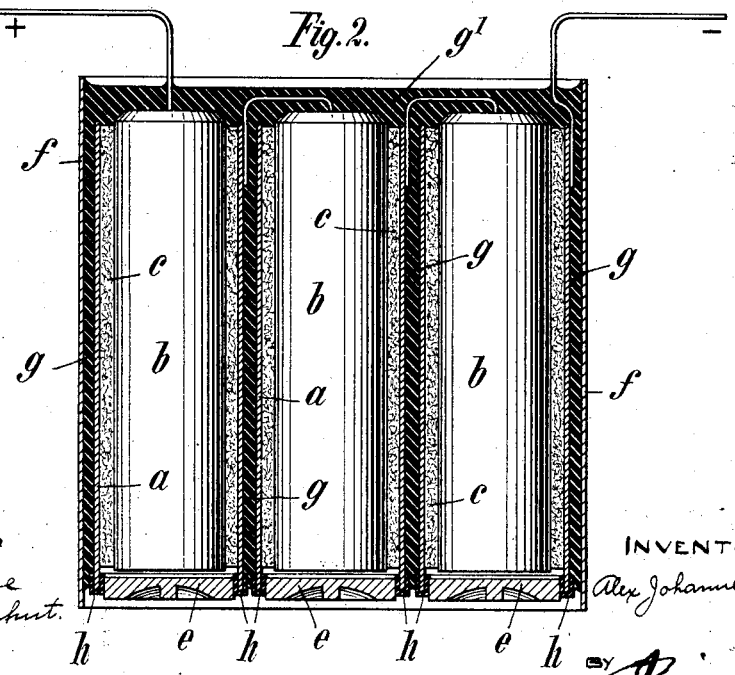
WITNESSES
H. M. Kuehne
Paul Neuhut
INVENTOR
Alex Johannes Jacobson
BY
ATTORNEYS No. 768,180. Patented August 23, 1904.

UNITED STATES PATENT OFFICE.

ALEX JOHANNES JACOBSON, OF HAMBURG, GERMANY.

GALVANIC BATTERY.

SPECIFICATION forming part of Letters Patent No. 768,180, dated August 23, 1904.

Application filed March 19, 1903. Serial No. 148,620. (No model.)

*To all whom it may concern:*

Be it known that I, ALEX JOHANNES JACOBSON, a subject of the German Emperor, and a resident of Hamburg, in the German Empire, have invented certain new and useful Improvements in Galvanic Batteries, of which the following is a specification.

The present invention relates to improvements in galvanic batteries.

The object of the improvements is to produce a galvanic battery which is capable of being kept in store and transported in an absolutely dry condition and of being rendered fit for use immediately by the addition or introduction of a suitable exciting liquid or electrolyte into the said battery or into the separate cells constituting such battery.

With the above object in view my invention consists in certain novel features of construction and combinations of parts, as will be hereinafter fully described, and pointed out in the claim.

In order that my invention may be more fully understood by one skilled in the art to which it appertains, I shall now proceed to describe the same in detail, reference being taken for that purpose to the accompanying sheet of drawings, wherein—

Figure 1 is a vertical longitudinal section of my improved galvanic battery or cell constructed in accordance with and embodying my invention. The galvanic battery is shown in the position it occupies when after the removal of the cover of the battery the electrolyte is poured out of its receptacle or container into the said battery in order to make the latter fit for use, and Fig. 2 a vertical longitudinal section of a galvanic battery composed of a plurality of separate cells.

Similar letters of reference indicate corresponding parts throughout the figures.

The improved galvanic battery or cell, Fig. 1, consists of a zinc or other metallic electrode $a$, preferably in the form of a cylinder, and of a carbon electrode $b$, placed within the zinc cylinder and having, preferably, a cylindrical or prismatic cross-sectional area. The space between the two electrodes is filled up with blotting-paper $c$ or a similar equivalent material adapted to suck in and to keep the electrolyte. At one end, preferably at the top, the cell—that is to say, the zinc cylinder $a$, forming at the same time the casing of the cell—is closed in the ordinary manner by a suitable cover $d$, consisting of asphalt, cement, or any other suitable insulating-mastic. The other end of the cell or the zinc cylinder, respectively, is closed by a removable cover $e$, of any suitable form and material.

When it is desired to put my improved battery or cell into operation, it is only necessary to remove the cover $e$ from the cell and to fill up the latter—that is to say, to soak the blotting-paper $c$ with any suitable electrolyte, such as ammonia solution or the like, by pouring it out from a suitable container $C$ into the inversed cell—as this is evident from Fig. 1. After the blotting-paper $c$ has been sufficiently soaked with electrolyte the cell is again closed by replacing the cover $e$ and is then ready for immediate use.

The arrangement of a removable cover at one end of the cell affords the great advantage that such cell can be kept dry until immediately before its first use, whereby greater efficiency and duration of the cell are secured, as galvanic batteries or cells when being kept in store and transported in a wet condition—that is to say, having the electrolyte or exciting mass filled in and being sealed at both ends, as is generally the case—will lose of their efficiency in proportion to the period of time they have been got ready.

In the modification shown by Fig. 2 the battery is composed of a plurality of the above-described cells. In the present example three galvanic cells are placed or arranged within a suitable socket or frame-shaped casing $f$, the individual cells being held in position and separated from one another and the surrounding casing or frame by a suitable insulating material $g$, such as asphalt, cement, or the like. At one end the casing, as well as the cells, are likewise closed by means of a suitable common cover $g'$, consisting of asphalt, cement, or any other suitable insulating-mastic. At the other or opposite end the casing and the cells remain open. At this open end the rims or edges of the zinc electrodes $a$ are insulated, preferably, by suitable cup-shaped rubber rings $h$, slid over and upon the upper edges of the said zinc electrodes. The insulating-rings $h$ at the open ends of the cells or zinc cylinders, respectively, prevent any short-circuiting of the cells by any overflowing electrolyte. The open ends of the zinc-electrode cylinders are closed by suitable removable covers or lids $e$, fitting into the said insulating-rings $h$. Instead of using separate covers for the zinc-electrode cylinders a suitably-shaped common cover or lid may be employed for all cells, as this will be readily understood without further explanation and pictural representation.

Having fully described my invention, what I do claim, and desire to secure by Letters Patent, is—

A galvanic battery constituted by a plurality of dry cells, thereby characterized, that the dry cells are provided at one end each with an opening or entrance capable of being locked or closed by a suitable cover and that the rim or edge of such opening is furnished with a suitable insulating means, in order to admit of the filling in of the electrolyte shortly before the use of the battery and without effecting any short circuit by any overflowing electrolyte, substantially as and for the purpose set forth.

ALEX JOHANNES JACOBSON.

Witnesses:
MAX LEMCKE.
E. H. L. MUMMENHOFF.